United States Patent
Kim et al.

(10) Patent No.: US 10,382,792 B2
(45) Date of Patent: Aug. 13, 2019

(54) METHOD AND APPARATUS FOR ENCODING AND DECODING VIDEO SIGNAL BY MEANS OF TRANSFORM-DOMAIN PREDICTION

(71) Applicant: LG Electronics Inc., Seoul (KR)

(72) Inventors: Chulkeun Kim, Seoul (KR); Jin Heo, Seoul (KR); Sehoon Yea, Seoul (KR)

(73) Assignee: LG ELECTRONICS INC., Seoul (KR)

(*) Notice: Subject to any disclaimer, the term of this patent is extended or adjusted under 35 U.S.C. 154(b) by 47 days.

(21) Appl. No.: 15/550,331

(22) PCT Filed: Feb. 15, 2016

(86) PCT No.: PCT/KR2016/001516
§ 371 (c)(1),
(2) Date: Aug. 10, 2017

(87) PCT Pub. No.: WO2016/129980
PCT Pub. Date: Aug. 18, 2016

(65) Prior Publication Data
US 2018/0063552 A1 Mar. 1, 2018

Related U.S. Application Data

(60) Provisional application No. 62/115,651, filed on Feb. 13, 2015.

(51) Int. Cl.
*H04N 19/82* (2014.01)
*H04N 19/139* (2014.01)
(Continued)

(52) U.S. Cl.
CPC .......... *H04N 19/82* (2014.11); *H04N 19/107* (2014.11); *H04N 19/139* (2014.11);
(Continued)

(58) Field of Classification Search
CPC ............... H04N 19/107; H04N 19/139; H04N 19/1059; H04N 19/48; H04N 19/593;
(Continued)

(56) References Cited

U.S. PATENT DOCUMENTS

2010/0310184 A1* 12/2010 Yu ................. H04N 19/105
382/238
2011/0293014 A1* 12/2011 Nakagami ........... H04N 19/105
375/240.16
(Continued)

FOREIGN PATENT DOCUMENTS

| KR | 20100045007 A | 5/2010 |
| KR | 20120009693 A | 2/2012 |
| KR | 20120082960 A | 7/2012 |

*Primary Examiner* — Dramos Kalapodas
(74) *Attorney, Agent, or Firm* — Dentons US LLP

(57) ABSTRACT

Disclosed is a method of decoding a video signal. The method includes extracting an intra-prediction mode of a current block from a video signal, generating a prediction block according to the intra-prediction mode, performing a transform on the prediction block, performing a filtering on the transformed prediction block using a spatial correlation coefficient, and generating a reconstruction block based on the filtered prediction block and a residual block, wherein the spatial correlation coefficient is a value determined based on a direction of the intra-prediction mode.

11 Claims, 15 Drawing Sheets

(51) Int. Cl.
*H04N 19/159* (2014.01)
*H04N 19/593* (2014.01)
*H04N 19/107* (2014.01)
*H04N 19/61* (2014.01)
*H04N 19/48* (2014.01)
*H04N 19/176* (2014.01)
*H04N 19/91* (2014.01)

(52) U.S. Cl.
CPC ........... *H04N 19/159* (2014.11); *H04N 19/48* (2014.11); *H04N 19/593* (2014.11); *H04N 19/61* (2014.11); *H04N 19/176* (2014.11); *H04N 19/91* (2014.11)

(58) Field of Classification Search
CPC ...... H04N 19/61; H04N 19/105; H04N 19/13; H04N 19/117; H04N 19/159; H04N 19/176; H04N 19/82
See application file for complete search history.

(56) References Cited

U.S. PATENT DOCUMENTS

| | | | |
|---|---|---|---|
| 2012/0213278 A1* | 8/2012 | Yasugi | H04N 19/176 375/240.12 |
| 2012/0224777 A1* | 9/2012 | Kim | H04N 19/176 382/238 |
| 2012/0230397 A1* | 9/2012 | Ouedraogo | H04N 19/70 375/240.03 |
| 2013/0215960 A1* | 8/2013 | Song | H04N 19/50 375/240.03 |
| 2014/0044166 A1* | 2/2014 | Xu | H04N 19/61 375/240.12 |
| 2014/0355678 A1* | 12/2014 | Watanabe | H04N 19/593 375/240.12 |
| 2014/0376631 A1 | 12/2014 | Sato | |

* cited by examiner

[FIG. 1]
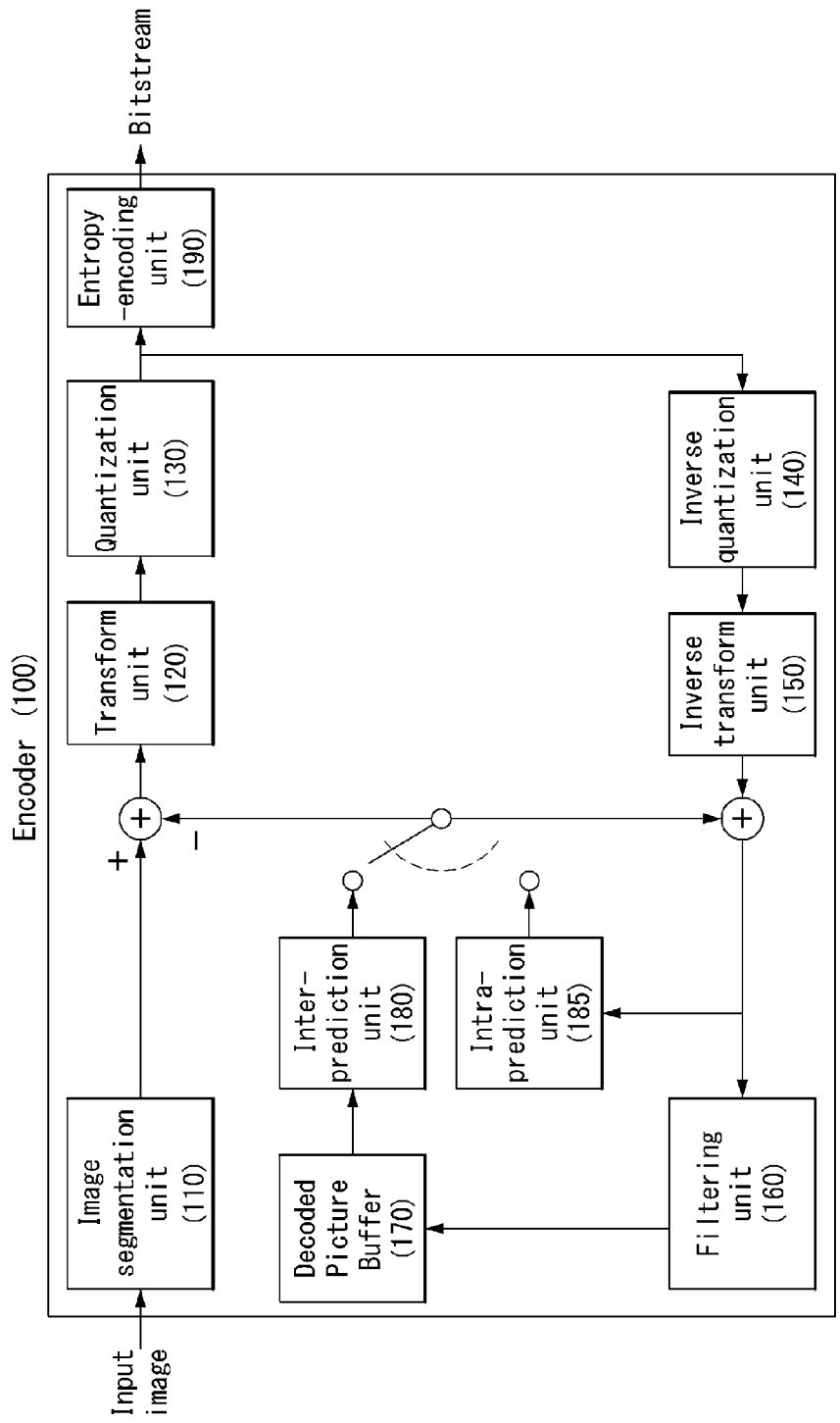

[FIG. 2]
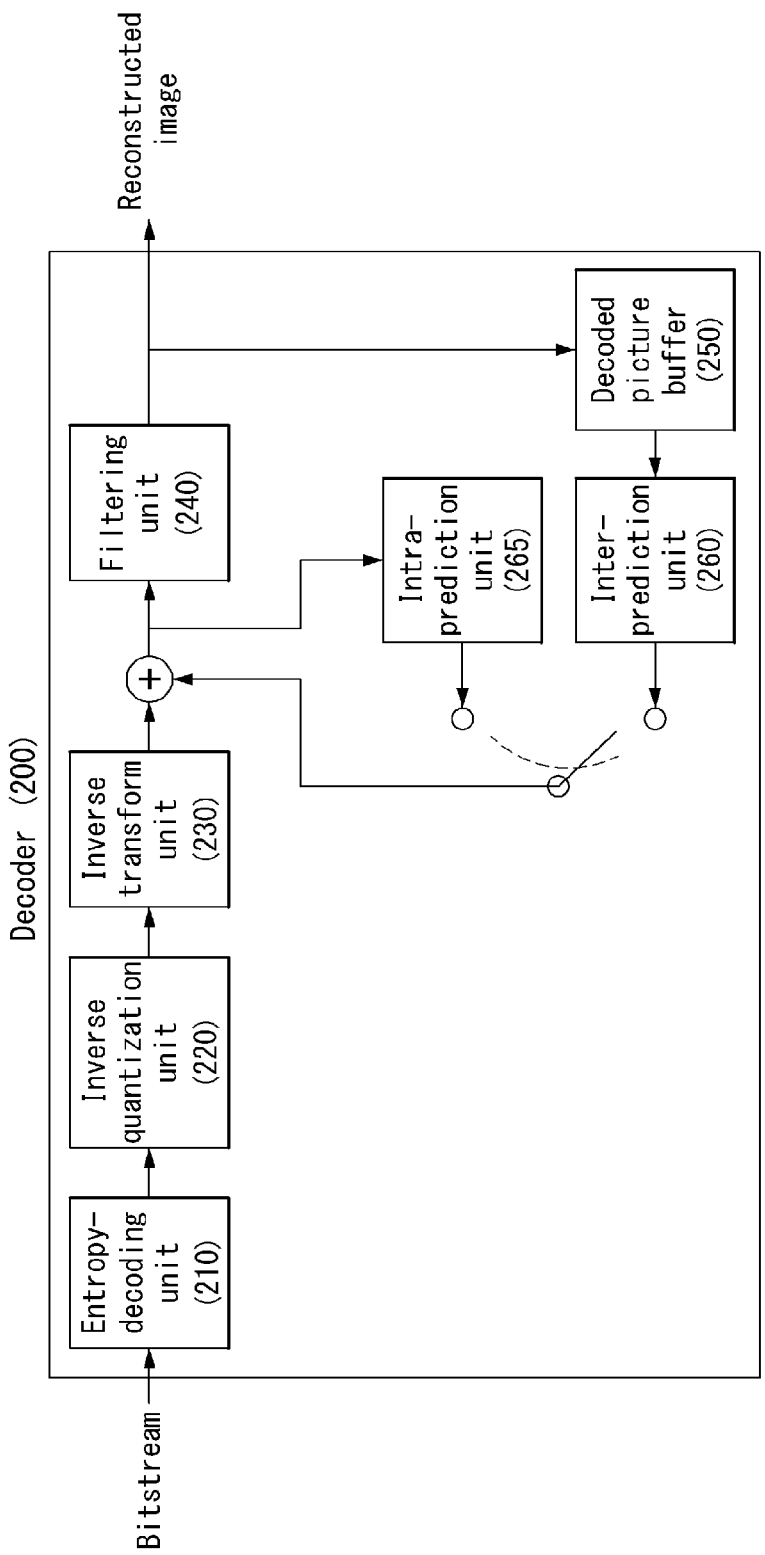

[FIG. 3]
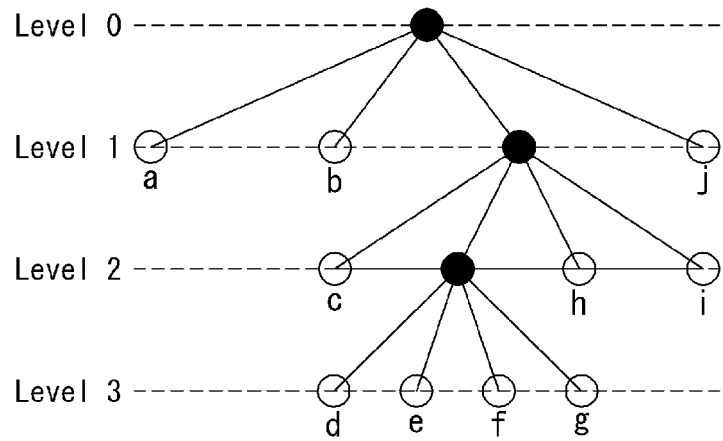
(a)
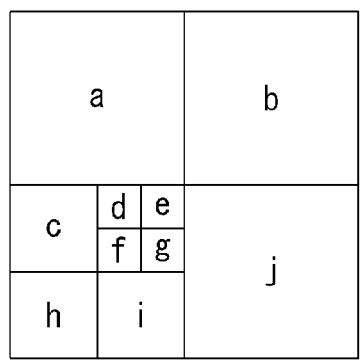
(b)

[FIG. 4]
Intra:
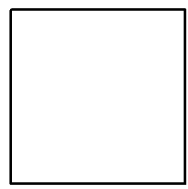 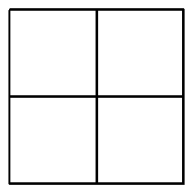
2Nx2N  NxN
Inter:
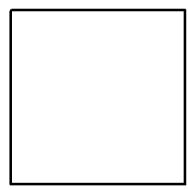 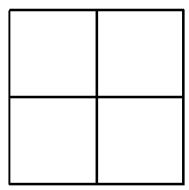 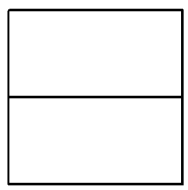 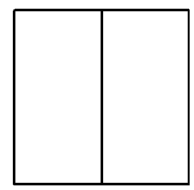
2Nx2N  NxN  2NxN  Nx2N
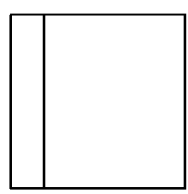 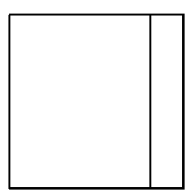 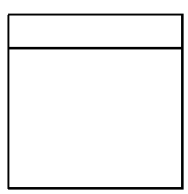 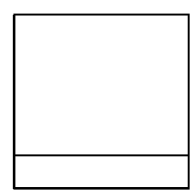
nLx2N  nRx2N  2NxnU  2NxnD

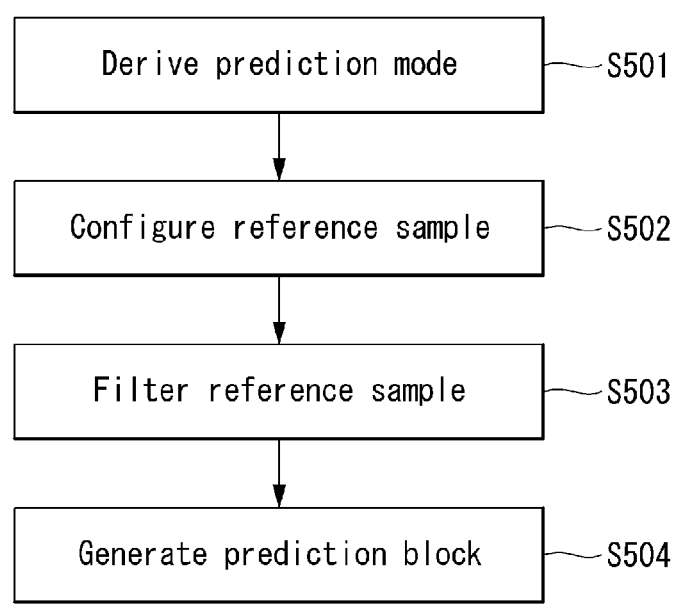
[FIG. 5]

[FIG. 6]
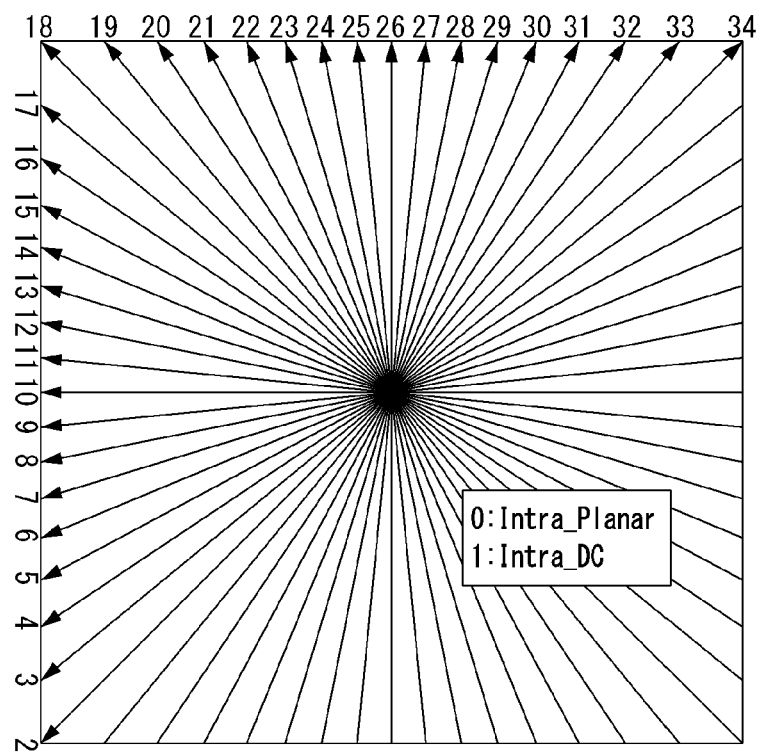

[FIG. 7]
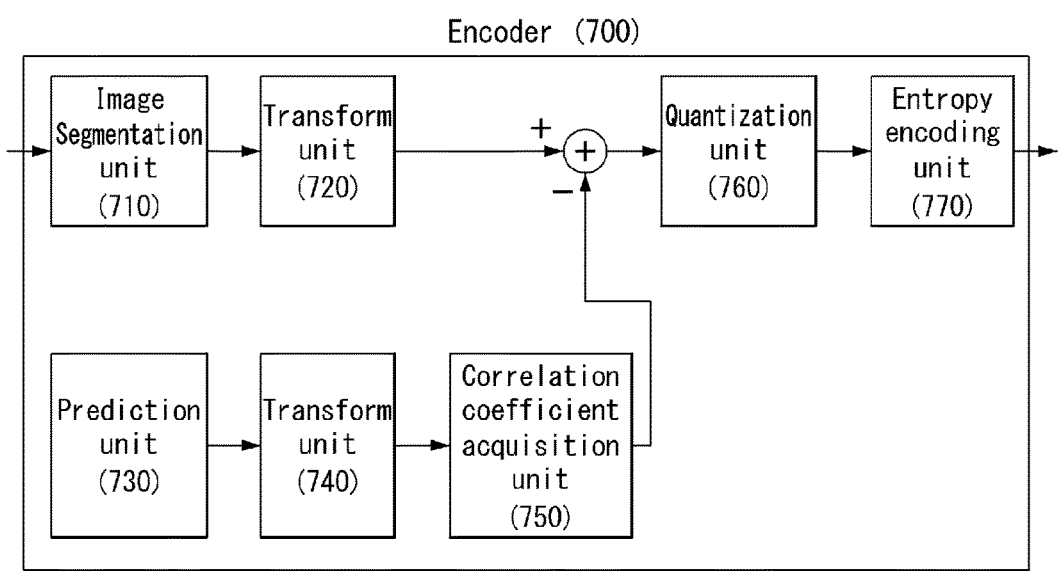

[FIG. 8]
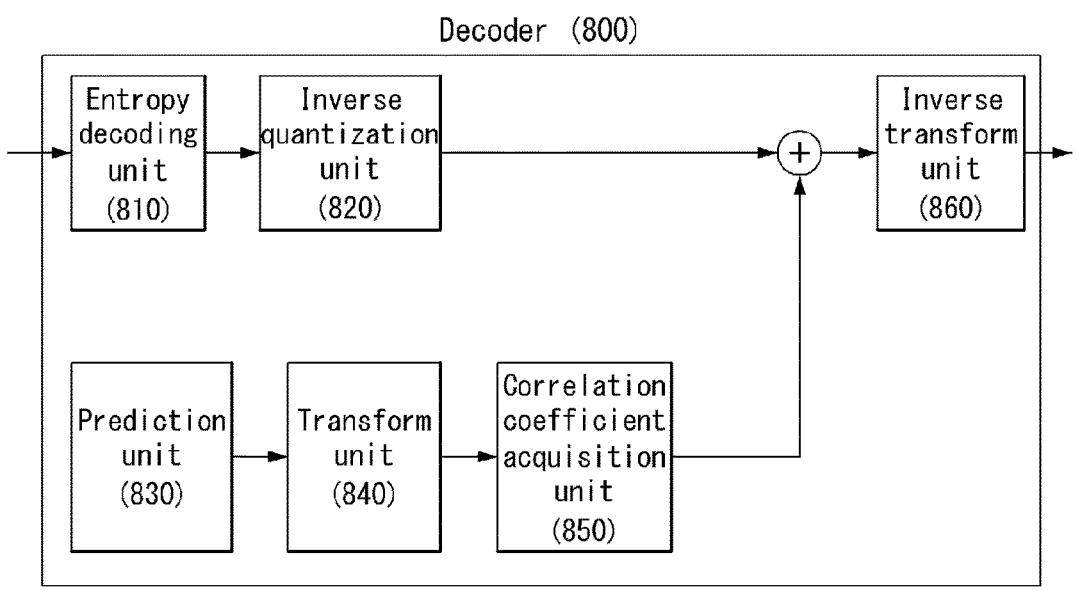

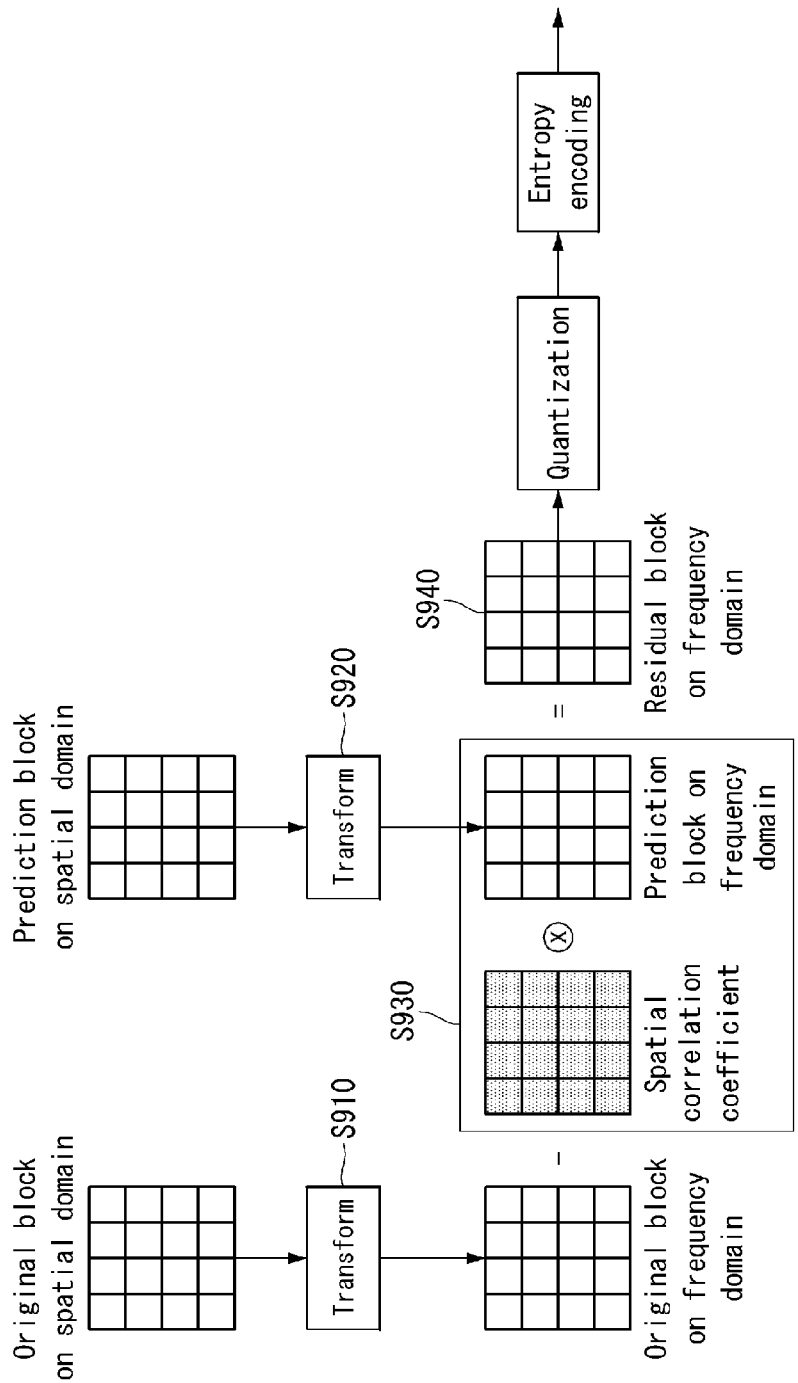
[FIG. 9]

[FIG. 10]
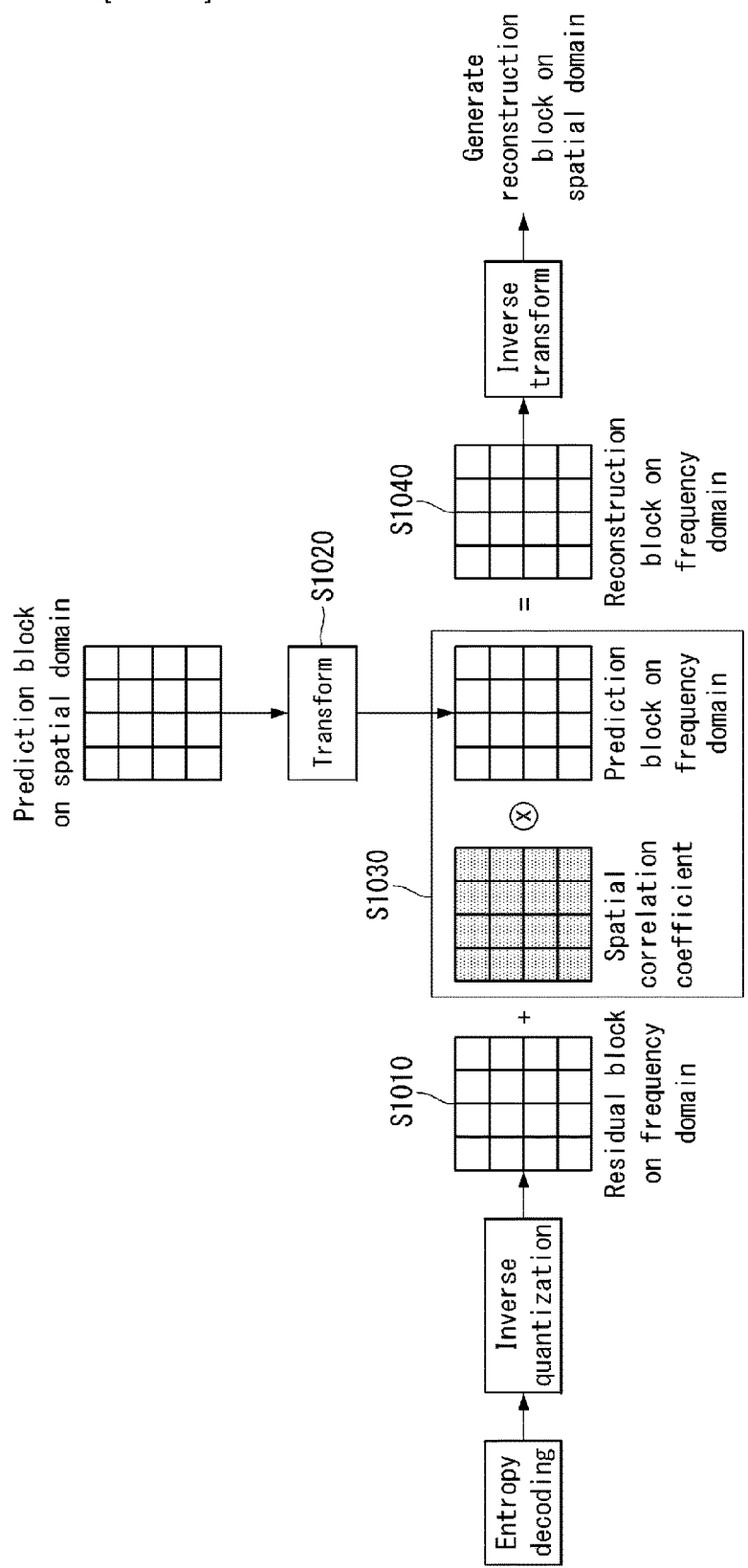

[FIG. 11]
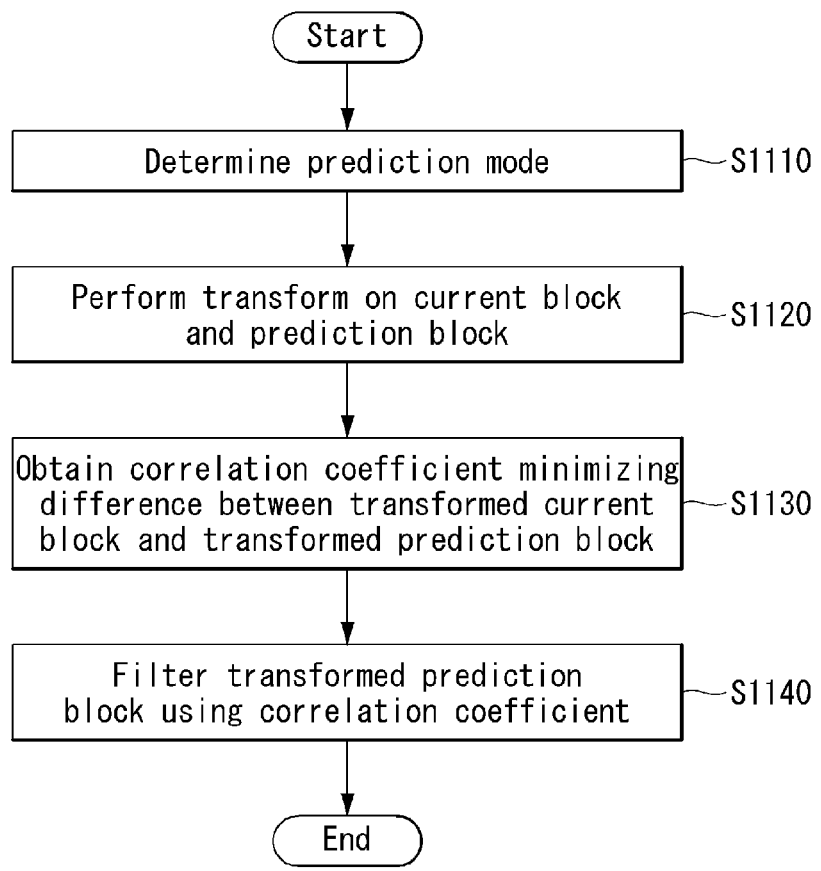

[FIG. 12]
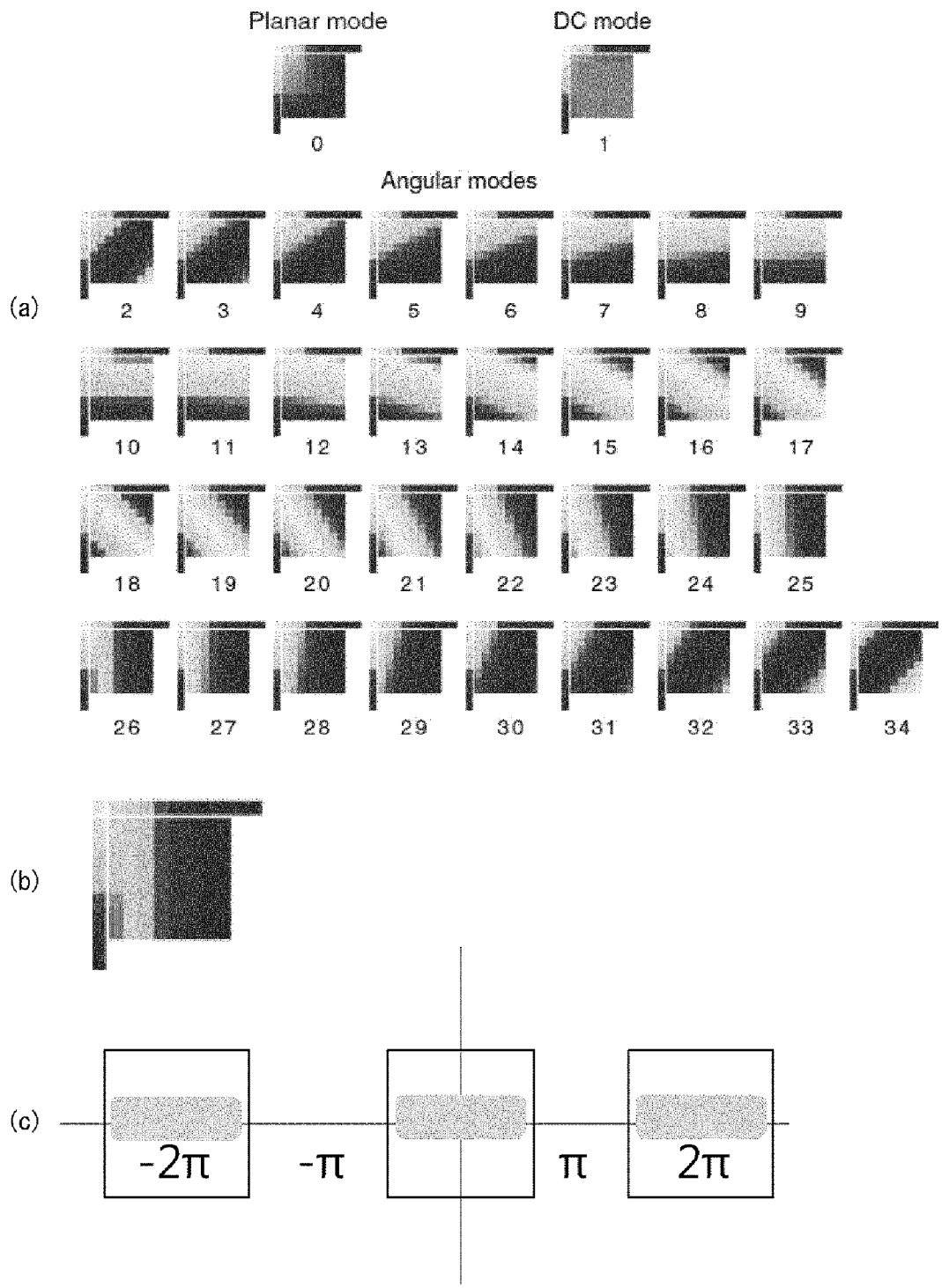

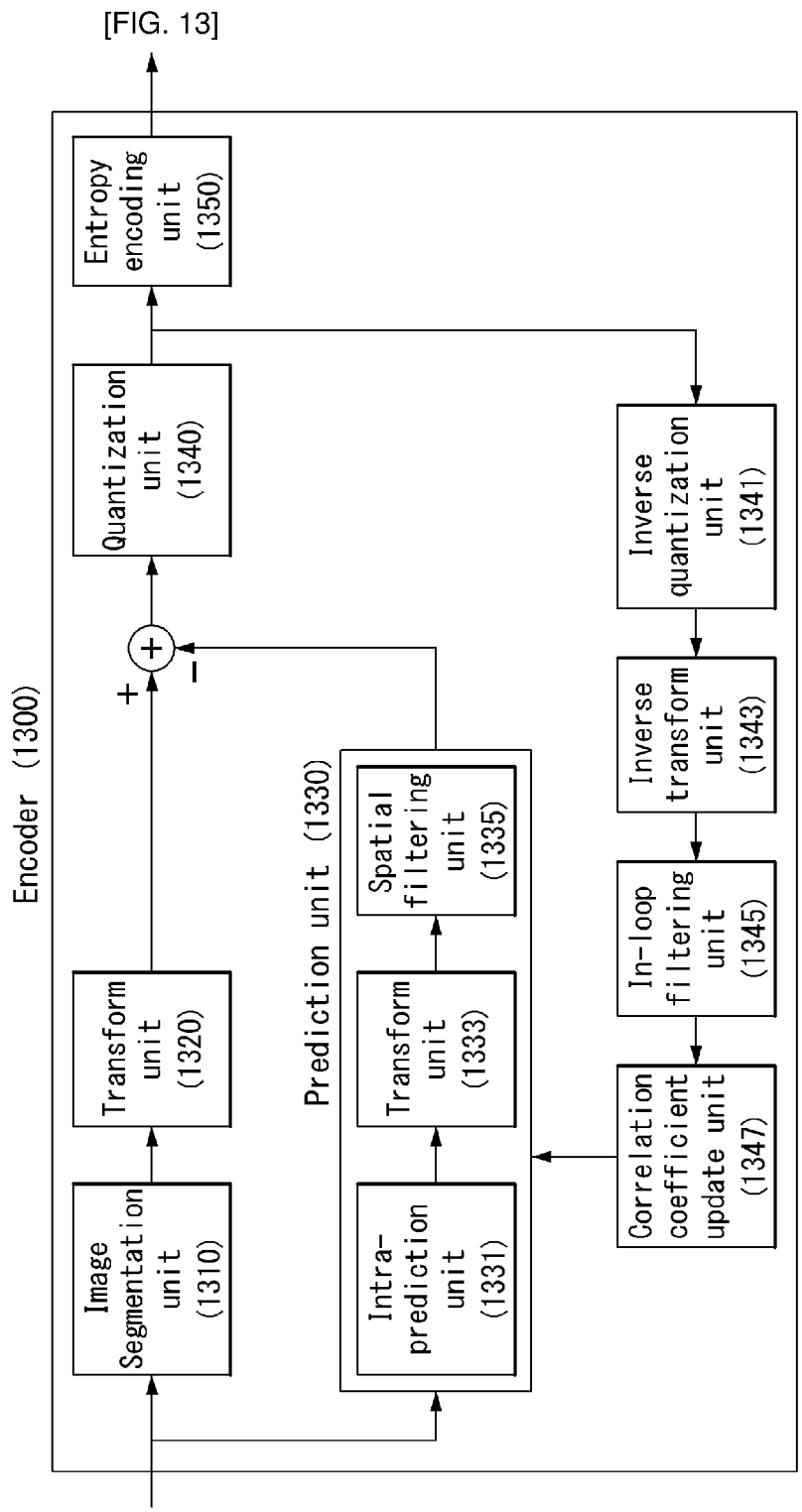
[FIG. 13]

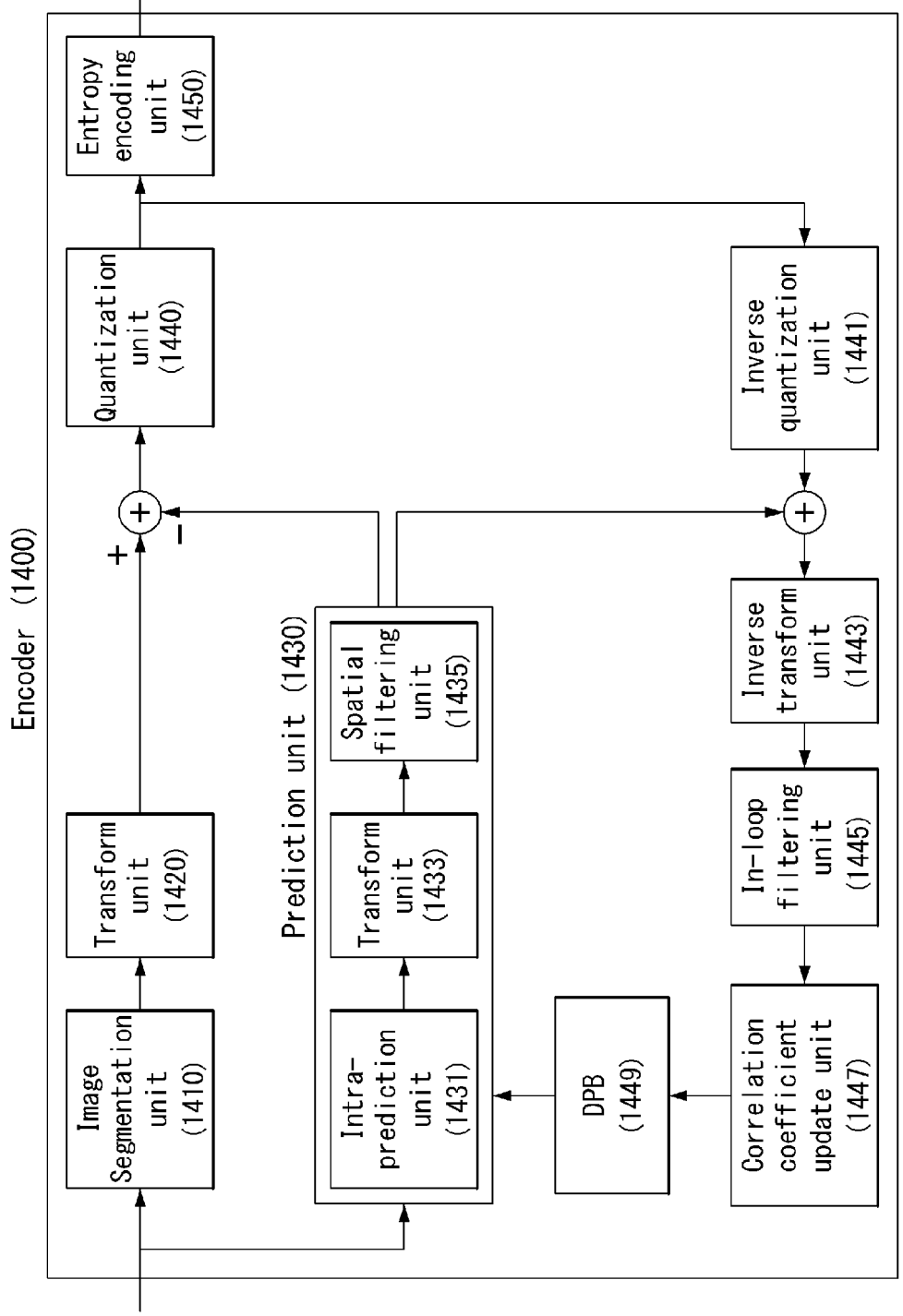
[FIG. 14]

[FIG. 15]
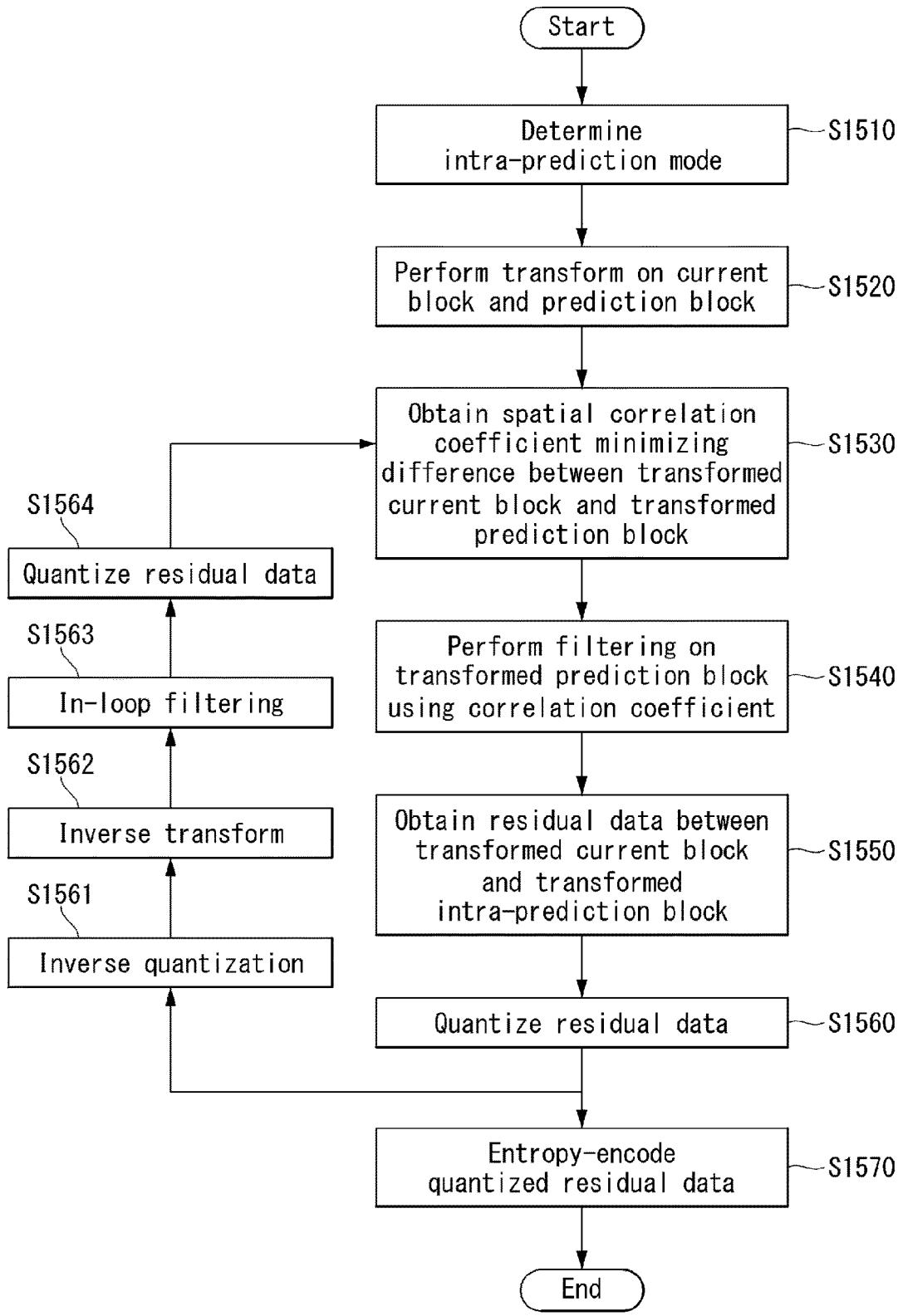

METHOD AND APPARATUS FOR ENCODING AND DECODING VIDEO SIGNAL BY MEANS OF TRANSFORM-DOMAIN PREDICTION

CROSS-REFERENCE TO RELATED APPLICATIONS

This application is the National Stage filing under 35 U.S.C. 371 of International Application No. PCT/KR2016/001516, filed on Feb. 15, 2016, which claims the benefit of U.S. Provisional Application No. 62/115,651, filed on Feb. 13, 2015, the contents of which are all hereby incorporated by reference herein in their entirety.

TECHNICAL FIELD

The present invention relates to a method and apparatus for encoding/decoding a video signal and, more particularly, to a technology for performing transform domain prediction by taking a directional correlation into consideration.

BACKGROUND ART

Disclosure

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

Technical Problem

The present invention is to propose a method of improving coding efficiency through a prediction filter design.

The present invention is to propose a method of improving prediction performance and the quality of a reconstructed frame through a prediction filter design.

The present invention is to propose a method of performing transform domain prediction by taking a directional correlation into consideration.

The present invention is to propose a method of calculating an optimum spatial correlation coefficient by taking a directional correlation into consideration.

The present invention is to propose a method of performing prediction filtering using an optimum spatial correlation coefficient.

The present invention is to propose a method of performing intra-prediction by taking a directional correlation into consideration.

The present invention is to propose a method of signaling newly designed prediction filter-related information.

Technical Solution

An embodiment of the present invention provides a method of designing a coding tool for high-efficiency compression.

Furthermore, an embodiment of the present invention provides a more efficiency prediction method in a prediction process.

Furthermore, an embodiment of the present invention provides a method of designing a prediction filter for improving coding efficiency.

Furthermore, an embodiment of the present invention provides a method of performing transform domain prediction by taking a directional correlation into consideration.

Furthermore, an embodiment of the present invention provides a method of calculating an optimum spatial correlation coefficient by taking a directional correlation into consideration.

Furthermore, an embodiment of the present invention provides a method of performing prediction filtering using an optimum spatial correlation coefficient.

Furthermore, an embodiment of the present invention provides a method of performing intra-prediction by taking a directional correlation into consideration.

Furthermore, an embodiment of the present invention provides a method of designing a prediction filter applied to a picture for intra-frame prediction or inter-frame prediction in a process of encoding or decoding a video signal.

Furthermore, an embodiment of the present invention provides a method of better predicting a target region.

Advantageous Effects

The present invention can improve prediction performance, can improve the quality of a reconstructed frame, and can also improve coding efficiency through a prediction filter design.

Furthermore, the present invention can improve prediction performance by performing transform domain prediction by taking a directional correlation into consideration.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 is a diagram illustrating a division structure of a coding unit according to an embodiment of the present invention.

FIG. 4 is an embodiment to which the present invention is applied and is a diagram for illustrating a prediction unit.

FIGS. 5 and 6 are embodiments to which the present invention is applied, wherein FIG. 5 is a diagram for illustrating an intra-prediction method and FIG. 6 is a diagram for illustrating a prediction direction according to an intra-prediction mode.

FIGS. 7 and 8 are embodiments to which the present invention is applied and show schematic block diagrams of an encoder and a decoder which perform transform domain prediction.

FIGS. 9 and 10 are embodiments to which the present invention is applied and are diagrams for illustrating a process of performing transform domain prediction.

FIG. 11 is an embodiment to which the present invention is applied and is a flowchart showing a process of performing transform domain prediction.

FIG. 12 is an embodiment to which the present invention is applied and is a diagram for illustrating a spatial direction on a transform domain.

FIG. 13 is an embodiment to which the present invention is applied and shows a schematic internal block diagram of an encoder which performing transform domain spatial prediction.

FIG. 14 is an embodiment to which the present invention is applied and shows a schematic internal block diagram of an encoder which performs transform domain temporal prediction.

FIG. 15 is an embodiment to which the present invention is applied and is a flowchart showing a method of performing transform domain spatial prediction.

BEST MODE

The present invention provides a method of decoding a video signal, including extracting an intra-prediction mode of a current block from a video signal, generating a prediction block according to the intra-prediction mode, performing a transform on the prediction block, performing a filtering on the transformed prediction block using a spatial correlation coefficient, and generating a reconstruction block based on the filtered prediction block and a residual block, wherein the spatial correlation coefficient is a value determined based on a direction of the intra-prediction mode.

In an embodiment of the present invention, the spatial correlation coefficient is a value to minimize a difference between the transformed current block and the transformed prediction block.

In an embodiment of the present invention, the spatial correlation coefficient has a different value depending on the intra-prediction mode.

In an embodiment of the present invention, the spatial correlation coefficient is a predetermined value or information transmitted by an encoder.

The present invention provides a method of encoding a video signal, including determining an intra-prediction mode of a current block, generating a prediction block according to the intra-prediction mode, performing a transform on the current block and the prediction block, obtaining a spatial correlation coefficient to minimize a difference between the transformed current block and the transformed prediction block, and performing a filtering on the transformed prediction block using the spatial correlation coefficient.

In an embodiment of the present invention, the method further includes obtaining a residual block based on the transformed current block and the filtered prediction block, performing a quantization on the residual block, and performing entropy encoding on the quantized residual block.

In an embodiment of the present invention, the spatial correlation coefficient is updated through the reconstruction process of the residual block.

In an embodiment of the present invention, the spatial correlation coefficient corresponds to a direction of the intra-prediction mode on a transform domain.

The present invention provides an apparatus for decoding a video signal, including a bitstream extraction unit configured to extract an intra-prediction mode of a current block from a video signal, an intra-prediction unit configured to generate a prediction block according to the intra-prediction mode, a transform unit configured to perform transform on the prediction block, a spatial filtering unit configured to perform filtering on the transformed prediction block using a spatial correlation coefficient, and a reconstruction unit configured to generate a reconstruction block based on the filtered prediction block and a residual block, wherein the spatial correlation coefficient is a value determined based on a direction of the intra-prediction mode.

The present invention provides an apparatus for encoding a video signal, including an intra-prediction unit configured to determine an intra-prediction mode of a current block and to generate a prediction block according to the intra-prediction mode, a transform unit configured to perform transform on the current block and the prediction block, and a spatial filtering unit configured to obtain a spatial correlation coefficient to minimize a difference between the transformed current block and the transformed prediction block and to perform filtering on the transformed prediction block using the spatial correlation coefficient.

In an embodiment of the present invention, the apparatus further includes a subtractor configured to obtain a residual block based on the transformed current block and the filtered prediction block, a quantization unit configured to perform quantization on the residual block, and an entropy encoding unit configured to perform entropy encoding on the quantized residual block.

Mode for Invention

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

FIGS. 5 and 6 are embodiments to which the present invention is applied. FIG. 5 is a diagram for illustrating an intra-prediction method and FIG. 6 is a diagram for illustrating a prediction direction according to an intra-prediction mode.

Referring to FIG. 5, the decoder may derive the intra-prediction mode of a current processing block (S501).

In intra-prediction, a prediction direction for the location of a reference sample used for prediction may be included depending on a prediction mode. In this specification, an intra-prediction mode having a prediction direction is called an intra-direction prediction mode "Intra_Angular prediction mode" or an intra-direction mode. In contrast, an intra-prediction mode not having a prediction direction includes intra planar (INTRA_PLANAR) prediction mode and an intra DC (INTRA_DC) prediction mode.

Table 1 illustrates names associated with the intra-prediction modes, and FIG. 6 illustrates prediction directions according to the intra-prediction modes.

TABLE 1

| INTRA-PREDICTION MODE | ASSOCIATED NAME |
| --- | --- |
| 0 | INTRA_PLANAR |
| 1 | INTRA_DC |
| 2 . . . 34 | Intra-direction (INTRA_ANGULAR2 . . . INTRA_ANGULAR34) |

In intra-prediction, prediction for a current processing block is performed based on a derived prediction mode. The reference sample and detailed prediction method used for prediction are different depending on the prediction mode. If a current block is encoded in the intra-prediction mode, the decoder may derive the prediction mode of the current block in order to perform prediction.

The decoder may check whether neighboring samples of the current processing block can be used for prediction and configure reference samples to be used for the prediction (S502).

In intra-prediction, neighboring samples of a current processing block mean a sample that neighbors the left boundary of the current processing block of an nS×nS size, a total of 2×nS samples that neighbor the bottom left, a sample that neighbors the top boundary of the current processing block, a total of 2×nS samples that neighbor the top right, and a sample that neighbors the top left of the current processing block.

However, some of the neighboring samples of the current processing block may have not been decoded or may not be available. In this case, the decoder may configure the reference samples to be used for prediction by substituting unavailable samples with available samples.

The decoder may filter the reference sample depending on an intra-prediction mode (S503).

Whether the filtering is to be performed on the reference sample may be determined based on the size of the current processing block. Furthermore, a method of filtering the reference sample may be determined by a filtering flag transferred by an encoder.

The decoder may generate a prediction block for the current processing block based on the intra-prediction mode and the reference samples (S504). That is, the decoder may generate the prediction block (i.e., generate the prediction sample) for the current processing block based on the intra-prediction mode derived in the intra-prediction mode derivation step S501 and the reference samples obtained through the reference sample configuration step S502 and the reference sample filtering step S503.

If the current processing block is encoded in the INTRA_DC mode, in order to minimize the discontinuity of the boundary between processing blocks, at step S504, the left boundary sample (i.e., a sample neighboring a left boundary within the prediction block) and top boundary sample (i.e., a sample neighboring a top boundary within the prediction block) of the prediction block may be filtered.

Furthermore, at step S504, filtering may be applied to the left boundary sample or the top boundary sample as in the INTRA_DC mode with respect to the vertical mode and horizontal mode of the intra-direction prediction modes.

More specifically, if the current processing block has been encoded in the vertical mode or horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for the prediction may be much shorter than the distance from a reference sample used for the prediction.

Accordingly, the decoder may adaptively apply filtering to left boundary samples or top boundary samples depending on whether an intra-prediction direction is the vertical direction or horizontal direction. That is, if the intra-prediction direction is the vertical direction, filtering may be applied to the left boundary samples. If the intra-prediction direction is the horizontal direction, filtering may be applied to the top boundary samples.

FIGS. 7 and 8 are embodiments to which the present invention is applied and show schematic block diagrams of an encoder and a decoder which perform transform domain prediction.

An embodiment of the present invention is to increase the accuracy of a prediction sample by taking into consideration the direction of an intra-prediction block in a transform domain.

FIG. 7 shows a schematic block diagram of the encoder which performs transform domain prediction. The encoder 700 includes an image segmentation unit 710, a transform unit 720, a prediction unit 730, a transform unit 740, a correlation coefficient acquisition unit 750, an adder/subtractor, a quantization unit 760 and an entropy encoding unit 770. The descriptions of the units given in connection with the encoder of FIG. 1 may be applied to the function units of FIG. 7. Accordingly, only portions necessary to describe the present embodiment of the present invention are described below.

Another embodiment of the present invention provides a prediction method in a transform domain (or frequency domain).

Both the original block and a prediction block may be transformed into a frequency domain by performing a transform on the two blocks. Furthermore, the residual block of the frequency domain may be generated by multiplying a coefficient that minimizes residual energy for each transform coefficient in the frequency domain. This can improve compression efficiency by reducing energy of the residual block.

First, the transform unit 720 may perform transform on a current block of the original image. Furthermore, the prediction unit 730 may perform intra-prediction or inter-prediction and generate a prediction block. The prediction block may be transformed into a frequency domain through the transform unit 740. In this case, the prediction block may be an intra-prediction block or an inter-prediction block.

The correlation coefficient acquisition unit 750 may obtain a correlation coefficient that minimizes a difference between the transformed current block and the prediction block. In this case, if the prediction block is an intra-prediction block, the correlation coefficient may be defined as a spatial correlation coefficient. If the prediction block is an inter-prediction block, the correlation coefficient may be defined as a temporal correlation coefficient. For another example, the correlation coefficient may be a value already set in the encoder or the obtained correlation coefficient may be coded and transmitted to a decoder.

The correlation coefficient acquisition unit 750 may filter the prediction block using the correlation coefficient. The function of the correlation coefficient acquisition unit 750 may be substituted with a filtering unit (not shown).

An optimum prediction block may be obtained by filtering the prediction block. The subtractor may generate a residual block by subtracting the optimum prediction block from the transformed current block.

The residual block may be quantized through the quantization unit 760 and may be entropy-encoded through the entropy encoding unit 770.

FIG. 8 shows a schematic block diagram of a decoder which performs transform domain prediction. The decoder 800 includes an entropy decoding unit 810, an inverse quantization unit 820, a prediction unit 830, a transform unit 840, a correlation coefficient acquisition unit 850, an adder/subtractor and an inverse transform unit 860. The descriptions of the units given in connection with the decoder of FIG. 2 may be applied to the function units of FIG. 8. Accordingly, only portions necessary to describe the present embodiment of the present invention are described below.

The prediction unit 830 may perform intra-prediction or inter-prediction and generate a prediction block. The prediction block may be transformed into a frequency domain through the transform unit 840. In this case, the prediction block may be an intra-prediction block or an inter-prediction block.

The correlation coefficient acquisition unit 850 may filter the transformed prediction block using a predetermined correlation coefficient or a correlation coefficient transmitted by an encoder.

Furthermore, a residual signal extracted from a bitstream may be obtained as a residual block on a transform domain through the entropy decoding unit 810 and the inverse quantization unit 820.

The adder may reconstruct a transform block by adding the filtered prediction block and the residual block on the transform domain. The inverse transform unit 860 may obtain a reconstruction image by inverse-transforming the reconstructed transform block.

FIGS. 9 and 10 are embodiments to which the present invention is applied and are diagrams for illustrating a process of performing transform domain prediction.

FIG. 9 illustrates an encoding process of performing transform domain prediction.

Assuming that a current block within the original image is a 4×4 original block, a 4×4 original block on a frequency domain may be obtained by performing a transform on a 4×4 original block on a spatial domain (S910).

Furthermore, a 4×4 prediction block on the spatial domain may be obtained according to a prediction mode. A 4×4 prediction block on the frequency domain may be obtained by performing a transform on the 4×4 prediction block on the spatial domain (S920). Furthermore, prediction accuracy can be improved by applying a correlation coefficient to the 4×4 prediction block on the frequency domain (S930). In this case, the correlation coefficient may mean a value that minimizes a difference between the 4×4 original block on the frequency domain and the 4×4 prediction block on the frequency domain.

In another embodiment, the correlation coefficient may have a different value depending on a prediction method. For example, if a prediction method is intra-prediction, the correlation coefficient may be called a spatial correlation coefficient. In this case, the spatial correlation coefficient may be determined based on a spatial direction of an intra-prediction mode. For another example, the correlation coefficient may have a different value depending on an intra-prediction mode. For example, in the case of a vertical mode and a horizontal mode, correlation coefficients may have different values.

Furthermore, if a prediction method is inter-prediction, the correlation coefficient may be called a temporal correlation coefficient. In this case, the temporal correlation coefficient may be determined based on temporal dependency of transform coefficients according to a motion trajectory.

A residual block on the frequency domain may be obtained by subtracting the 4×4 prediction block on the frequency domain from the 4×4 original block on the frequency domain (S940).

Thereafter, the residual block on the frequency domain may be quantized and entropy-coded.

FIG. 10 illustrates a decoding process of performing transform domain prediction.

The decoder may receive residual data from the encoder and may obtain a residual block on a frequency domain by performing entropy coding and inverse quantization on the residual data (S1010).

Furthermore, the decoder may obtain a 4×4 prediction block on a spatial domain depending on a prediction mode, and may obtain a 4×4 prediction block on the frequency domain by performing a transform on the 4×4 prediction block on the spatial domain (S1020). Furthermore, the decoder can improve prediction accuracy by applying a correlation coefficient to the 4×4 prediction block on the frequency domain (S1030). In this case, the correlation coefficient may be a predetermined value or information transmitted by an encoder.

A reconstruction block on the frequency domain may be obtained by adding the residual block on the frequency domain and the 4×4 prediction block on the frequency domain (S1040).

The reconstruction block on the frequency domain may generate a reconstruction block on the spatial domain (or pixel domain) through an inverse transform process.

FIG. 11 is an embodiment to which the present invention is applied and is a flowchart showing a process of performing transform domain prediction.

When the original image is received, the encoder may perform prediction on a current block. In this case, the encoder determines a prediction mode that minimizes an error with the current block (S1110) and generates a prediction block based on the prediction mode.

An embodiment of the present invention provides a prediction method in the transform domain (or frequency domain). Accordingly, the current block and the prediction block to be coded may be expressed as values on the transform domain by performing a transform on the current block and prediction block (S1120).

A correlation coefficient that minimizes a difference between the transformed current block and the transformed prediction block may be obtained (S1130). An optimum prediction block may be generated by applying the correlation coefficient to the transformed prediction block (S1140).

In this case, the correlation coefficient may have a different value depending on a prediction mode. For example, if the prediction mode is intra-prediction, the correlation coefficient may have a different value depending on an intra-prediction mode. In this case, the correlation coefficient may be determined based on the spatial direction of the intra-prediction mode.

For another example, if the prediction mode is inter-prediction, the correlation coefficient may have a different value depending on an inter-prediction mode. In this case, the correlation coefficient may be determined based on the temporal dependency of transform coefficients according to a motion trajectory.

FIG. 12 is an embodiment to which the present invention is applied and is a diagram for illustrating a spatial direction on the transform domain.

Intra-prediction is a method of predicting a value to be now coded using a neighboring sample value. Intra-prediction may include two non-direction prediction modes and thirty-three direction prediction modes, for example.

FIG. 12(a) is a diagram for illustrating the direction of prediction blocks generated according to the intra-prediction mode. FIG. 12(a) shows 8×8 prediction blocks generated according to the intra-prediction mode. This shows a direction on the spatial domain.

FIG. 12(b) shows the case of the vertical mode (mode 26) in the above 8×8 prediction blocks. It may be seen that the pixel values of a prediction block have a vertical direction. A direction prediction method selected as described above may represent the direction characteristics of a target to be now coded.

FIG. 12(c) shows an 8×8 prediction block on the transform domain which has been obtained by performing a transform on the 8×8 prediction block that is the vertical mode in FIG. 12(b). From FIG. 12(c), it may be seen that in the case of the vertical mode, the 8×8 prediction block on the transform domain has the characteristics of a horizontal direction. As described above, a directional correlation may appear on the transform domain in addition to the spatial domain.

Accordingly, an embodiment of the present invention is to provide a prediction method on the transform domain.

FIG. 13 is an embodiment to which the present invention is applied and shows a schematic internal block diagram of an encoder which performing transform domain spatial prediction.

FIG. 13 shows a schematic internal block diagram of the encoder performing transform domain spatial prediction. The encoder 1300 includes an image segmentation unit 1310, a transform unit 1320, a prediction unit 1330, an adder/subtractor, a quantization unit 1340, an inverse quantization unit 1341, an inverse transform unit 1343, an in-loop filtering unit 1345, a correlation coefficient update unit 1347 and an entropy encoding unit 1350. Furthermore, the prediction unit 1330 includes an intra-prediction unit 1331, a transform unit 1333 and a spatial filtering unit 1335. The descriptions of the units given in connection with the encoders of FIGS. 1 and 7 may be applied to the function units of FIG. 13. Accordingly, only portions necessary to describe the present embodiment of the present invention are described below.

An embodiment of the present invention is to improve the accuracy of a prediction sample by taking into consideration the direction of an intra-prediction block on the transform domain. After receiving the original image, the encoder may partition the original image into one or more processing units through the image segmentation unit 1310. An embodiment of the present invention is to take into consideration the direction of a prediction block on the transform domain, and thus a current block to be coded is transformed through the transform unit 1320.

The intra-prediction unit 1331 may generate a prediction block according to an intra-prediction mode. The prediction block may be transformed into a frequency domain through the transform unit 1333.

The spatial filtering unit 1335 may obtain a spatial correlation coefficient that minimizes a difference between the transformed current block and the transformed prediction block. The spatial correlation coefficient may be coded and transmitted to a decoder. For another example, the spatial correlation coefficient may be a predetermined value. In this case, the spatial correlation coefficient may be previously calculated through online or offline training prior to coding.

The spatial filtering unit 1335 may filter the transformed prediction block using the spatial correlation coefficient. In this case, a low-pass filter or a Wiener filter may be used for the filtering method. The filtered prediction block may be obtained by filtering the prediction block. The subtractor may generate a residual block by subtracting the filtered prediction block from the transformed current block.

As described above, a residual signal generated through direction or non-direction prediction according to a prediction mode has a different correlation depending on a selected prediction mode. Accordingly, an embodiment of the present invention provides a method of calculating an optimum spatial correlation coefficient.

In an embodiment of the present invention, a loop process may be used to calculate an optimum spatial correlation coefficient depending on each prediction mode. That is, the spatial correlation coefficient may be updated through the loop process.

For example, the residual block may be quantized through the quantization unit 1340 and may be then inverse-quantized through the inverse quantization unit 1341. The inverse-quantized residual block may be reconstructed into a residual block on the spatial domain through the inverse transform unit 1343 and may be filter through the in-loop filtering unit 1345.

The correlation coefficient update unit 1347 may update the spatial correlation coefficient based on the filtered residual block. The spatial correlation coefficient may be updated based on Equations 1 to 3 below.

$$Xn = \rho Xn' + Zn \qquad \text{[Equation 1]}$$

In Equation 1, Xn denotes the transform coefficient of the original block, Xn' denotes the transform coefficient of the prediction block, and ρ denotes the spatial correlation coefficient. Furthermore, Zn indicates a difference between the transform coefficient of the prediction block to which the spatial correlation coefficient has been applied and the transform coefficient of the original block.

$$J = E((x_n - \rho x'_n)^2) \qquad \text{[Equation 2]}$$

$$\rho = \frac{E(x_n x'_n)}{E(\tilde{x}'^2_n)} \qquad \text{[Equation 3]}$$

In an embodiment of the present invention, a spatial correlation coefficient for minimizing a mean square prediction error can be calculated through Equation 2 and Equation 3.

The sequence for updating the spatial correlation coefficient or the filtering location of the spatial correlation coefficient may be changed, but the present invention is not limited thereto. For example, the correlation coefficient update unit 1347 may be located in front of the inverse transform unit 1343.

When the spatial correlation coefficient is updated, the prediction unit 1330 may generate a more accurate prediction block based on the updated spatial correlation coefficient.

The finally generated residual block may be quantized through the quantization unit 1340 and may be entropy-encoded through the entropy encoding unit 1350.

In another embodiment of the present invention, the spatial correlation coefficient may be generated or updated based on the characteristics of a prediction value. For example, in an intra-prediction mode, in the case of a vertical mode and a horizontal mode, the spatial correlation coefficient may have a different value. In this case, the encoder/decoder may separately manage the spatial correlation coefficient depending on a prediction mode.

In an embodiment, additional bits and complexity can be reduced by matching one spatial correlation coefficient and prediction modes having a similar characteristic. For example, at least one of a vertical direction, a horizontal direction, a diagonal direction and a non-direction may be classified as one class, and one spatial correlation coefficient may be matched to the class. For detailed example, the intra-prediction modes 22 to 30 having a vertical direction may be classified as one class, and one spatial correlation coefficient may be matched to the one class.

In another embodiment, after prediction modes are classified through training and statistics, a spatial correlation coefficient may be matched to each classification group.

The embodiments have been described with respect to an intra-prediction mode, but may also be applied to an inter-prediction mode.

FIG. 14 is an embodiment to which the present invention is applied and shows a schematic internal block diagram of an encoder which performs transform domain temporal prediction.

FIG. 14 shows a schematic internal block diagram of the encoder which performs transform domain temporal prediction. The encoder 1400 includes an image segmentation unit 1410, a transform unit 1420, a prediction unit 1430, an adder/subtractor, a quantization unit 1440, an inverse quantization unit 1441, an inverse transform unit 1443, an in-loop filtering unit 1445, a correlation coefficient update unit 1447, a DPB 1449 and an entropy encoding unit 1450. Furthermore, the prediction unit 1430 includes an inter-prediction unit 1431, a transform unit 1433 and a spatial filtering unit 1435. The descriptions of the units given in connection with the encoders of FIGS. 1, 7 and 13 may be applied to the function units of FIG. 14. Accordingly, only portions necessary to describe the present embodiment of the present invention are described below.

An embodiment of the present invention is to increase the accuracy of a prediction sample by taking into consideration the temporal dependency of transform coefficients according to a motion trajectory. After receiving the original image, the encoder may partition the original image into one or more processing units through the image segmentation unit 1410. In an embodiment of the present invention, the temporal dependency of transform coefficients according to a motion trajectory is taken into consideration, and thus a current block to be coded is transformed through the transform unit 1420.

The inter-prediction unit 1431 may generate a prediction block based on an inter-prediction mode. The prediction block may be transformed into a frequency domain through the transform unit 1433.

The spatial filtering unit 1435 may obtain a temporal correlation coefficient that minimizes a difference between the transformed current block and the transformed prediction block. The temporal correlation coefficient may be coded and transmitted to a decoder. For another example, the temporal correlation coefficient may be a predetermined value. In this case, the temporal correlation coefficient may be previously calculated through online or offline training prior to coding.

The spatial filtering unit 1435 may filter the transformed prediction block using the temporal correlation coefficient. A filtered prediction block may be obtained by filtering the prediction block. The subtractor may generate a residual block by subtracting the filtered prediction block from the transformed current block.

In an embodiment of the present invention, a loop process may be used to calculate an optimum temporal correlation coefficient depending on each inter-prediction mode. That is, a temporal correlation coefficient may be updated through the loop process.

For example, the residual block may be quantized through the quantization unit 1440 and may be inverse-quantized again through the inverse quantization unit 1441. The inverse-quantized residual block may be added to the filtered prediction block to reconstruct a transform block on a transform domain. Furthermore, a reconstruction block on a spatial domain may be generated through the inverse transform unit 1443 and filtered through the in-loop filtering unit 1445.

The correlation coefficient update unit 1447 may update the temporal correlation coefficient based on the filtered reconstruction block. The sequence in which the temporal correlation coefficient is updated or the filtering location of the temporal correlation coefficient may be changed, but the present invention is not limited thereto. For example, the correlation coefficient update unit 1447 may be located in front of the inverse transform unit 1443. When the temporal correlation coefficient is updated, a reconstruction image to which the temporal correlation coefficient has been applied may be stored in the DPB 1449 and used again for future inter-prediction.

The prediction unit 1430 may generate a more accurate prediction block based on the updated temporal correlation coefficient. Accordingly, the finally generated residual block may be quantized through the quantization unit 1440 and may be entropy-encoded through the entropy encoding unit 1450.

FIG. 15 is an embodiment to which the present invention is applied and is a flowchart showing a method of performing transform domain spatial prediction.

An embodiment of the present invention provides a method of performing prediction by taking into consideration the spatial direction of an intra-prediction mode on a transform domain.

When the original image is received, the encoder may perform intra-prediction on a current block. In this case, the encoder determines an intra-prediction mode that minimizes an error with the current block (S1510) and generates a prediction block depending on an intra-prediction mode.

The encoder may express the current block and the prediction block as values on a transform domain by performing a transform on the current block and the prediction block (S1520).

The encoder may obtain a spatial correlation coefficient that minimizes a difference between the transformed current block and the transformed prediction block (S1530), and may generate a filtered prediction block by applying the spatial correlation coefficient to the transformed prediction block (S1540).

In this case, the spatial correlation coefficient may have a different value depending on an intra-prediction mode. For example, in the case of a vertical mode, a horizontal mode, a non-direction mode and a diagonal mode, different spatial correlation coefficients may be calculated.

For another example, one spatial correlation coefficient may be allocated to intra-prediction modes having a similar directional characteristic. For example, at least any one of the vertical direction, horizontal direction, diagonal direction and non-direction may be classified as one class, and one spatial correlation coefficient may be matched to the one class. For detailed example, the intra-prediction modes 22 to 30 having a vertical direction may be classified as one class, and one spatial correlation coefficient may be matched to the one class. Alternatively, after an intra-prediction mode is classified through training and statistics, a spatial correlation coefficient may be mapped to each classification group.

Thereafter, the encoder may obtain residual data between the transformed current block and the transformed prediction block (S1550), may quantize the residual data (S1560), and may entropy-encode the quantized residual data (S1570).

In another embodiment of the present invention, a loop process may be used to calculate an optimum spatial correlation coefficient depending on each prediction mode. That is, a spatial correlation coefficient may be updated through the loop process.

For example, the quantized residual data may be reconstructed as residual data on the spatial domain through inverse quantization and inverse transform again and may be filtered through in-loop filtering. Furthermore, the encoder may update the spatial correlation coefficient based on the filtered residual data. Equations 1 to 3 may be used to update the spatial correlation coefficient.

As described above, the embodiments described in the present invention may be implemented in a computer, processor, micro-processor, controller or chip and performed. For example, the function units shown in FIGS. 1, 2, 7, 8 and 13 to 14 may be implemented in a computer, processor, micro-processor, controller or chip and performed.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a video signal, comprising:
   extracting an intra-prediction mode of a current block from a video signal;
   generating a prediction block according to the intra-prediction mode;
   performing a transform on the prediction block;
   performing a filtering on the transformed prediction block on the frequency domain using a spatial correlation coefficient to minimize a difference between a transformed current block on a frequency domain and a transformed prediction block on the frequency domain;
   generating a reconstruction block on the frequency domain by adding a residual block on the frequency domain and the filtered prediction block on the frequency domain,
   generating a reconstruction block on the spatial domain performing an inverse transform on the reconstruction block on the frequency domain,
   wherein the spatial correlation coefficient is a value determined based on a direction of the intra-prediction mode,
   wherein the spatial correlation coefficient has a different value depending on the intra-prediction mode.

2. The method of claim 1, wherein the spatial correlation coefficient is a predetermined value or information transmitted by an encoder.

3. A method of encoding a video signal, comprising:
   determining an intra-prediction mode of a current block;
   generating a prediction block according to the intra-prediction mode;
   performing a transform on the current block and the prediction block;
   obtaining a spatial correlation coefficient to minimize a difference between the transformed current block on a frequency domain and the transformed prediction block on the frequency domain;
   performing a filtering on the transformed prediction block on the frequency domain using the spatial correlation coefficient; and
   obtaining a residual block on the frequency domain by subtracting the filtered prediction block on the frequency domain from the transformed current block,
   wherein the spatial correlation coefficient has a different value depending on the intra-prediction mode.

4. The method of claim 3, further comprising:
performing a quantization on the residual block; and
performing an entropy encoding on the quantized residual block.

5. The method of claim 4, wherein the spatial correlation coefficient is updated through a reconstruction process of the residual block.

6. The method of claim 3, wherein the spatial correlation coefficient corresponds to a direction of the intra-prediction mode on a transform domain.

7. An apparatus for decoding a video signal, comprising:
a bitstream extraction unit configured to extract an intra-prediction mode of a current block from a video signal;
an intra-prediction unit configured to generate a prediction block according to the intra-prediction mode;
a transform unit configured to perform a transform on the prediction block;
a spatial filtering unit configured to perform a filtering on the transformed prediction block on the frequency domain using a spatial correlation coefficient to minimize a difference between a transformed current block on a frequency domain and a transformed prediction block on the frequency domain; and
a reconstruction unit configured to generate a reconstruction block on the frequency domain by adding a residual block on the frequency domain and the filtered prediction block on the frequency domain,
an inverse transform unit configured to generate the reconstruction block on the spatial domain performing an inverse transform on the reconstruction block on the frequency domain,
wherein the spatial correlation coefficient is a value determined based on a direction of the intra-prediction mode.

8. The apparatus of claim 6, wherein the spatial correlation coefficient has a different value depending on the intra-prediction mode.

9. The apparatus of claim 6, wherein the spatial correlation coefficient is a predetermined value or information transmitted by an encoder.

10. An apparatus for encoding a video signal, comprising:
an intra-prediction unit configured to determine an intra-prediction mode of a current block and to generate a prediction block according to the intra-prediction mode;
a transform unit configured to perform a transform on the current block and the prediction block;
a spatial filtering unit configured to obtain a spatial correlation coefficient to minimize a difference between the transformed current block on a frequency domain and the transformed prediction block on the frequency domain and to perform a filtering on the transformed prediction block on the frequency domain using the spatial correlation coefficient; and
a subtractor configured to obtain a residual block on the frequency domain by subtracting the filtered prediction block on the frequency domain from the transformed current original block,
wherein the spatial correlation coefficient has a different value depending on the intra-prediction mode.

11. The apparatus of claim 10, wherein further comprising:
a quantization unit configured to perform a quantization on the residual block; and
an entropy encoding unit configured to perform an entropy encoding on the quantized residual block.

* * * * *